F. R. COOPER & J. LEMMON.

PLOW.

No. 10,411. Reissued Nov. 27, 1883.

WITNESSES

Jas. E. Hutchinson

S. G. Nottingham.

INVENTOR

Francis R. Cooper, and

John Lemmon.

By H. A. Seymour. Attorney

N. PETERS, Photo-Lithographer, Washington, D. C.

UNITED STATES PATENT OFFICE.

FRANCIS R. COOPER AND JOHN LEMMON, OF COLERAIN, OHIO.

PLOW.

SPECIFICATION forming part of Reissued Letters Patent No. 10,411, dated November 27, 1883.

Original No. 253,347, dated February 7, 1882. Application for reissue filed March 24, 1883.

*To all whom it may concern:*

Be it known that we, FRANCIS R. COOPER and JOHN LEMMON, citizens of the United States, residing at Colerain, in the county of Belmont and State of Ohio, have invented certain new and useful Improvements in Plows; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in shovel or corn plows; and it consists in the construction and arrangement of the several parts, hereinafter described, and specifically pointed out in the claims.

Figure 1:
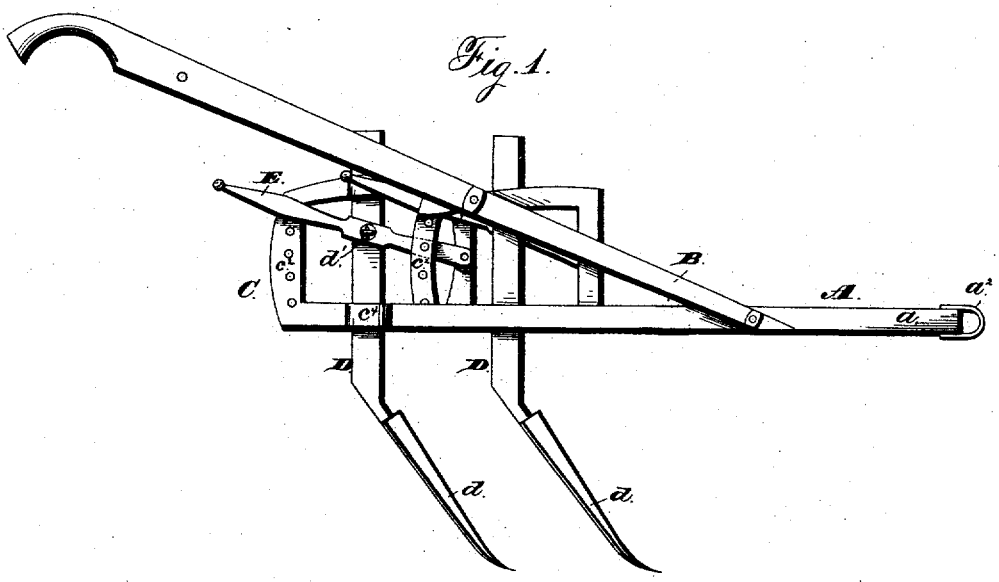
Figure 2:
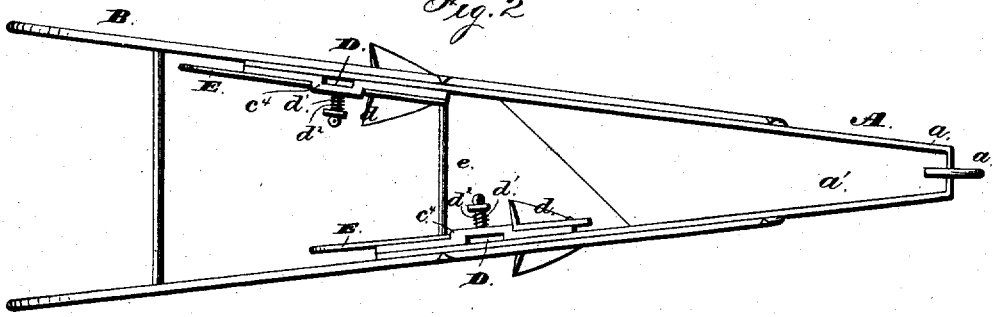
Figure 3:
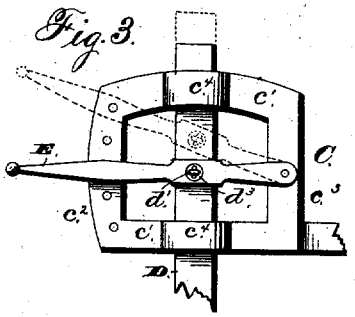
Figure 4:
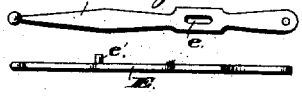

In the drawings, Figure 1 is an elevation, and Fig. 2 is a plan view, of a plow constructed according to our invention; and Figs. 3 and 4 are detail views of parts thereof.

*a a* are the beams, made preferably of a single piece of metal bent into proper form at forward end and braced by intermediate filling-piece, *a'*, as shown. The bar *a* is extended to rear of piece *a'* to provide means for securing the standard adjusting-frames, as shown, and will be hereinafter described.

$a^2$ is the clevis passed around the front of bar *a* and through the piece *a'* in rear of bar *a*, as shown.

B are the handles, properly connected to beam A, and extended rearward and inclined upward at proper angle to be grasped by operator.

C C are the standard adjusting-frames, the lower sides of which are secured to the opposite ends of bar *a*, while their top sides are secured to the handles B and connected together by the bar *c*, extended from front part of top of one frame to rear part of top of other frame, the one frame being arranged in advance of the other, as shown. As both of these frames C are alike in construction, the description of one will answer for both. The frame C is composed of the end bars, *c' c'*, and the side bars, $c^2$ $c^3$. The end bars, *c'*, are constructed with bosses $c^4$, through which are cast or formed vertical openings, the one arranged in a vertical line below the other, as shown. The side bar $c^2$ is provided with a series of holes or notches arranged in the arc of a circle, and in position to be entered or engaged by the pin on the adjusting-lever, as will be hereinafter described.

D is the standard, having the shovel *d* secured to its lower end, as shown. The standard is formed the shape of the openings through bosses $c^4$, and so as to fit and smoothly slide in said openings.

*d'* is a pin, extended from the standard D between the end bars, *c'*, of frame C.

$d^2$ is a coil-spring placed around the pin *d'*, and arranged to bear between the adjusting-lever and a washer, $d^3$, secured on outer end of pin *d'*, as shown.

E is the adjusting-lever. It is hinged to the side bar $c^3$ and extended across the frame, and provided with an elongated opening, *e*, which is passed over the pin *d'* on standard D, to which it is held by the coil-spring $d^2$, as shown.

*e'* is a pin arranged on the lever E in proper position to enter the openings or notches serially arranged on side bar, $c^2$, as before described.

It will be observed the pins *d'* on standards D project toward each other, and that the adjusting-levers are released from the positions in which they are held by pressing them inward or toward each other.

The advantages and operation of our invention are evident. The standards may be adjusted so as to bring the shovels on a level with each other, so as to adapt the plow to use on level ground or in use on hillside, where our plow is particularly superior. One shovel may be adjusted toward or away from level of other, as desired, according to the steepness of hill and direction of plowing, and the position of shovels may be readily reversed when the end of row on hillside has been reached and the plow turned. This adjustment is also accomplished without affecting the position of the plow beam and handles, which always preserve their upright positions. Thus in use on a hill, by raising one shovel and lowering the other each shovel may be made to run equal with the other, while the body of the plow stands level. The shovel, also, being held in a vertical position, will not throw the dirt away from the upper row, nor down the hill onto the lower row as badly as when the shovels are run perpendicular to the slant of the ground. Thus the shovels can be run closer to the corn, and will not tend to cover small corn as badly as plows of ordinary construction; also, in plowing corn after it begins to joint and is tender the body of the plow, being in a vertical position, will permit the shovels to be run close to the corn without the body of the plow injuring the same.

Having fully described our invention, what we claim as new, and desire to secure by Letters Patent, is—

1. The combination, with a draft-frame carrying a notched or perforated frame, which latter supports the upper end of the plow-standard, and a lever pivotally secured thereto and adapted to engage with the notches or perforations thereof, of a plow or shovel standard passing through suitable openings in the said frames and connected to said lever, substantially as set forth.

2. The combination, with a triangular draft-frame composed of two divergent portions, a slotted or perforated frame mounted upon each of said members, and a lever pivotally connected to each of said frames and adapted to engage with the notches or perforations thereof, of a shovel-standard mounted movably in bosses upon each of said frames, and a spring connection between each of said standards and levers, substantially as and for the purpose set forth.

3. The combination, in a cultivator, of the beams $a$, frames C, having perforated sides $a^2$ and sockets $c^4$, the levers E, having slots $e$ and studs $e'$, the pins and springs $d'$ $d^2$, and the standard D, substantially as shown and described.

FRANCIS R. COOPER.
JOHN LEMMON.

Witnesses:
WM. A. SHARON,
J. C. SHARON.